(12) United States Patent
Iwasa et al.

(10) Patent No.: US 10,766,347 B2
(45) Date of Patent: Sep. 8, 2020

(54) VEHICLE BATTERY MOUNTING STRUCTURE

(75) Inventors: Makoto Iwasa, Chigasaki (JP); Hidetoshi Kadota, Yamato (JP); Tadayoshi Hashimura, Machida (JP); Satoshi Shigematsu, Yokohama (JP); Nobuhiro Mori, Odawara (JP); Kentaro Hatta, Yokosuka (JP)

(73) Assignee: NISSAN MOTOR CO., LTD., Yokohama-shi (JP)

( * ) Notice: Subject to any disclaimer, the term of this patent is extended or adjusted under 35 U.S.C. 154(b) by 142 days.

(21) Appl. No.: 13/202,516

(22) PCT Filed: Feb. 19, 2010

(86) PCT No.: PCT/JP2010/053022
§ 371 (c)(1),
(2), (4) Date: Aug. 19, 2011

(87) PCT Pub. No.: WO2010/098418
PCT Pub. Date: Sep. 2, 2010

(65) Prior Publication Data
US 2011/0300427 A1 Dec. 8, 2011

(30) Foreign Application Priority Data
Feb. 24, 2009 (JP) .................. 2009-041227
Jul. 17, 2009 (JP) .................. 2009-169005

(51) Int. Cl.
*B60K 1/04* (2019.01)
*H01M 2/10* (2006.01)

(52) U.S. Cl.
CPC ............ *B60K 1/04* (2013.01); *H01M 2/1083* (2013.01); *B60K 2001/0438* (2013.01); *B60Y 2306/01* (2013.01); *H01M 2220/20* (2013.01)

(58) Field of Classification Search
CPC .. B01K 1/04; B60R 16/04; B60K 2001/0438; H01M 2/1072–1083; H01M 2220/20
(Continued)

(56) References Cited

U.S. PATENT DOCUMENTS 4,365,681 A 12/1982 Singh
5,378,555 A 1/1995 Waters et al.
(Continued)

FOREIGN PATENT DOCUMENTS

CN 1703333 A 11/2005
CN 1742396 A 3/2006
(Continued)

OTHER PUBLICATIONS

IDPL Machine Translation of JP 2004-179053 A.*
(Continued)

*Primary Examiner* — Robert S Carrico
(74) *Attorney, Agent, or Firm* — Foley & Lardner LLP (57) ABSTRACT

A battery unit (38F) comprising a plurality of batteries (3) and a connection control device (35a, 35b, 36a, 36b, 36d, 36e) which controls electrical connection relating to the battery unit (38F) are provided in a vehicle (1). The battery unit (38F) comprises two groups (S1R, S1L) of the batteries (3) disposed to have a space (G) there-between, and the connection control device (35a, 35b, 36a, 36b, 36d, 36e) is disposed in the space (G). The layout of the connection control device (35a, 35b, 36a, 36b, 36d, 36e) is thereby optimized and the length of a harness (34) can be shortened.

22 Claims, 11 Drawing Sheets (58) Field of Classification Search
USPC .......................................................... 429/153
See application file for complete search history.

(56) References Cited

U.S. PATENT DOCUMENTS

| | | | |
|---|---|---|---|
| 5,501,289 A | 3/1996 | Nishikawa et al. | |
| 5,534,364 A * | 7/1996 | Watanabe | B60L 3/0046 180/65.1 |
| 5,601,942 A * | 2/1997 | Fedele | H01M 2/1061 29/623.4 |
| 6,085,854 A | 7/2000 | Nishikawa | |
| 6,188,574 B1 * | 2/2001 | Anazawa | 361/695 |
| 6,632,560 B1 | 10/2003 | Zhou et al. | |
| 6,986,969 B2 | 1/2006 | Anglin et al. | |
| 7,052,799 B2 | 5/2006 | Zatezalo et al. | |
| 7,094,495 B2 | 8/2006 | Anglin et al. | |
| 7,136,766 B2 | 11/2006 | Yasuda | |
| 7,140,745 B2 | 11/2006 | Yuen | |
| 7,424,926 B2 | 9/2008 | Tsuchiya | |
| 7,610,978 B2 | 11/2009 | Takasaki et al. | |
| 7,654,352 B2 | 2/2010 | Takasaki et al. | |
| 7,931,105 B2 | 4/2011 | Sato et al. | |
| 2002/0102447 A1 * | 8/2002 | Kato | 429/23 |
| 2003/0003351 A1 * | 1/2003 | Ogata | H01M 2/0242 429/120 |
| 2003/0054239 A1 * | 3/2003 | Watanabe | H01M 2/1072 429/152 |
| 2003/0209375 A1 | 11/2003 | Suzuki et al. | |
| 2004/0062955 A1 | 4/2004 | Kubota et al. | |
| 2004/0134699 A1 | 7/2004 | Shimizu | |
| 2006/0237248 A1 | 10/2006 | Hayashi | |
| 2006/0272877 A1 | 12/2006 | Nozaki et al. | |
| 2007/0007060 A1 | 1/2007 | Ono et al. | |
| 2007/0009787 A1 | 1/2007 | Straubel et al. | |
| 2007/0292752 A1 * | 12/2007 | Tsuchiya | H01M 2/1072 429/120 |
| 2008/0160394 A1 | 7/2008 | Takasaki et al. | |
| 2008/0248377 A1 | 10/2008 | Hashida | |
| 2009/0145676 A1 * | 6/2009 | Takasaki | B60K 1/04 180/65.1 |
| 2009/0152034 A1 * | 6/2009 | Takasaki | B60K 1/04 180/68.5 |
| 2009/0167077 A1 | 7/2009 | Tsuchiya et al. | |

FOREIGN PATENT DOCUMENTS

| | | |
|---|---|---|
| CN | 1881654 A | 12/2006 |
| CN | 1885591 A | 12/2006 |
| CN | 200977849 Y | 11/2007 |
| CN | 101209661 A | 7/2008 |
| EP | 1 939 028 A1 | 7/2008 |
| JP | 6-219336 A | 8/1994 |
| JP | 7-14564 A | 1/1995 |
| JP | 7-156826 A | 6/1995 |
| JP | 9-104239 A | 4/1997 |
| JP | 2000-38035 A | 2/2000 |
| JP | 3199296 B2 | 6/2001 |
| JP | 2004-9986 A | 1/2004 |
| JP | 2004-179053 A | 6/2004 |
| JP | 2004-196217 A | 7/2004 |
| JP | 2006-182295 A | 7/2006 |
| JP | 2006-240502 A | 9/2006 |
| JP | 2007-254262 A | 10/2007 |
| JP | 2007-280806 A | 10/2007 |
| JP | 2007-314989 A | 12/2007 |
| JP | 2007-323729 A | 12/2007 |
| JP | 2007-331669 A | 12/2007 |
| JP | 2008-34745 A | 2/2008 |
| JP | 2008-162497 A | 7/2008 |
| JP | 2008-183947 A | 8/2008 |
| JP | 2008-260382 A | 10/2008 |
| JP | 2009-83600 A | 4/2009 |
| JP | 2009-83601 A | 4/2009 |
| JP | 2009-87774 A | 4/2009 |
| JP | 2009-137408 A | 6/2009 |
| JP | 2009-193942 A | 8/2009 |
| JP | 4306783 B2 | 8/2009 |
| JP | 4386131 B2 | 12/2009 |
| KR | 2003-88941 A | 11/2003 |
| KR | 10-2005-0100436 | 10/2005 |
| RU | 2113366 C1 | 6/1998 |
| RU | 2192356 C2 | 11/2002 |
| RU | 2 260 538 C2 | 9/2005 |
| WO | WO 98/12763 A1 | 3/1998 |
| WO | WO 2004/030968 A1 | 4/2004 |
| WO | WO 2007/145304 A1 | 12/2007 |
| WO | WO 2008-125946 A1 | 10/2008 |

OTHER PUBLICATIONS

M. Iwasa et al., U.S. Final Office Action, U.S. Appl. No. 13/202,472, dated Mar. 4, 2013, (7 pgs.).
M. Iwasa et al., U.S. Notice of Allowance; U.S. Appl. No. 13/202,472, dated Jun. 21, 2013, (12 pages).
Surface Vehicle Information Report, *SAE The Engineering Society for Advancing Mobility Land Sea Air and Space International*, SAE, J2344, Issued Jun. 1998, 11 pages.
M. Iwasa et al., U.S. Non-Final Office Action, U.S. Appl. No. 13/202,472, dated Aug. 15, 2012, (13 pgs.).
U.S. Appl. No. 13/202,472, filed Aug. 19, 2011, Iwasa et al.
U.S. Appl. No. 13/202,469, filed Aug. 19, 2011, Iwasa et al.
Russian Office Action and English Language Translation dated Nov. 9, 2012 (8 pages).
Chinese Office Action dated Sep. 16, 2013, (8 pages).
Japanese Office Action dated Sep. 17, 2013, (3 pages).
Supplementary European Search Report dated May 6, 2014, (5 pgs.).
M. Iwasa et al., U.S. Non-Final Office Action, U.S. Appl. No. 13/202,469, dated Jun. 10, 2014, (7 pgs.).
M. Iwasa et al., U.S. Non-Final Office Action, U.S. Appl. No. 13/202,469, dated Jan. 13, 2015, (30 pgs.).
M. Iwasa et al., U.S. Final Office Action, U.S. Appl. No. 13/202,469, dated Aug. 11, 2015, (17 pgs.).
M. Iwasa et al., U.S. Non-Final Office Action, U.S. Appl. No. 13/202,469, dated Jun. 23, 2016, (15 pgs.).
USPTO Office Action, U.S. Appl. No. 13/202,469, dated Jan. 26, 2017, 20 pages.
USPTO Office Action, U.S. Appl. No. 13/202,469, dated Jan. 25, 2018, 75 pages (US 2003/0209375 A1, US 2003/0066694 A1, U.S. Pat. No. 6,085,854).
USPTO Office Action, U.S. Appl. No. 13/202,469, dated Oct. 5, 2018, 17 pages.
USPTO Office Action, U.S. Appl. No. 13/202,469, dated May 16, 2019, 23 pages.

* cited by examiner

VEHICLE BATTERY MOUNTING STRUCTURE

FIELD OF THE INVENTION

This invention relates to a layout of a connection control device for a number of batteries mounted on a vehicle.

BACKGROUND OF THE INVENTION

Japanese Patent Serial No. 3199296, issued by The Japan Patent Office in 2001, teaches placing a number of the batteries side by side under a floor panel of a vehicle so as to mount as many batteries as possible on the vehicle.

The batteries are arranged side by side in a flat plane in a vehicle transverse direction as well as a vehicle longitudinal direction to form a group of batteries.

SUMMARY OF THE INVENTION

According to this prior art device, the group of batteries is mounted under a floor in a region extending from a front seat to a rear seat, and an electric equipment such as an electric motor for driving the vehicle and an inverter for the electric equipment are mounted in a front compartment of the vehicle.

The batteries are connected to a harness and connected to the electric equipment via the harness. A connection control device such as a switch is interposed in the harness.

Herein, the batteries are disposed densely to form the group and the connection control device is essentially disposed between the group of batteries and the electric equipment. Accordingly, a space for disposing the connection control device between the front seat and the front compartment is required. However, it is not always possible to obtain a space for the connection control device in an optimum location. If the space for the connection control device is not available in an optimum location, it is inevitable that a required length of the harness increases.

It is therefore an object of this invention to optimize a layout of a connection control device interposed between the group of the batteries and the electric equipment, thereby shortening the required length of the harness.

To achieve the above object, this invention provides a vehicle battery mounting structure for mounting a plurality of batteries under a floor panel of a vehicle. The vehicle battery mounting structure comprises a battery unit comprising a plurality of batteries and a connection control device which controls electrical connection relating to the battery unit. The battery unit comprises two groups of the batteries disposed to have a space there-between, and the connection control device is disposed in the space.

This invention also provides a battery assembly comprising a plurality of batteries and mounted under a floor panel of a vehicle, The battery assembly comprises a battery unit comprising a plurality of the batteries and a connection control device which controls electrical connection relating to the battery unit. The battery unit comprises two groups of the batteries disposed to have a space there-between, and the connection control device is disposed in the space.

The details as well as other features and advantages of this invention are set forth in the remainder of the specification and are shown in the accompanying drawings.

DESCRIPTION OF THE PREFERRED EMBODIMENTS

Figure 1:
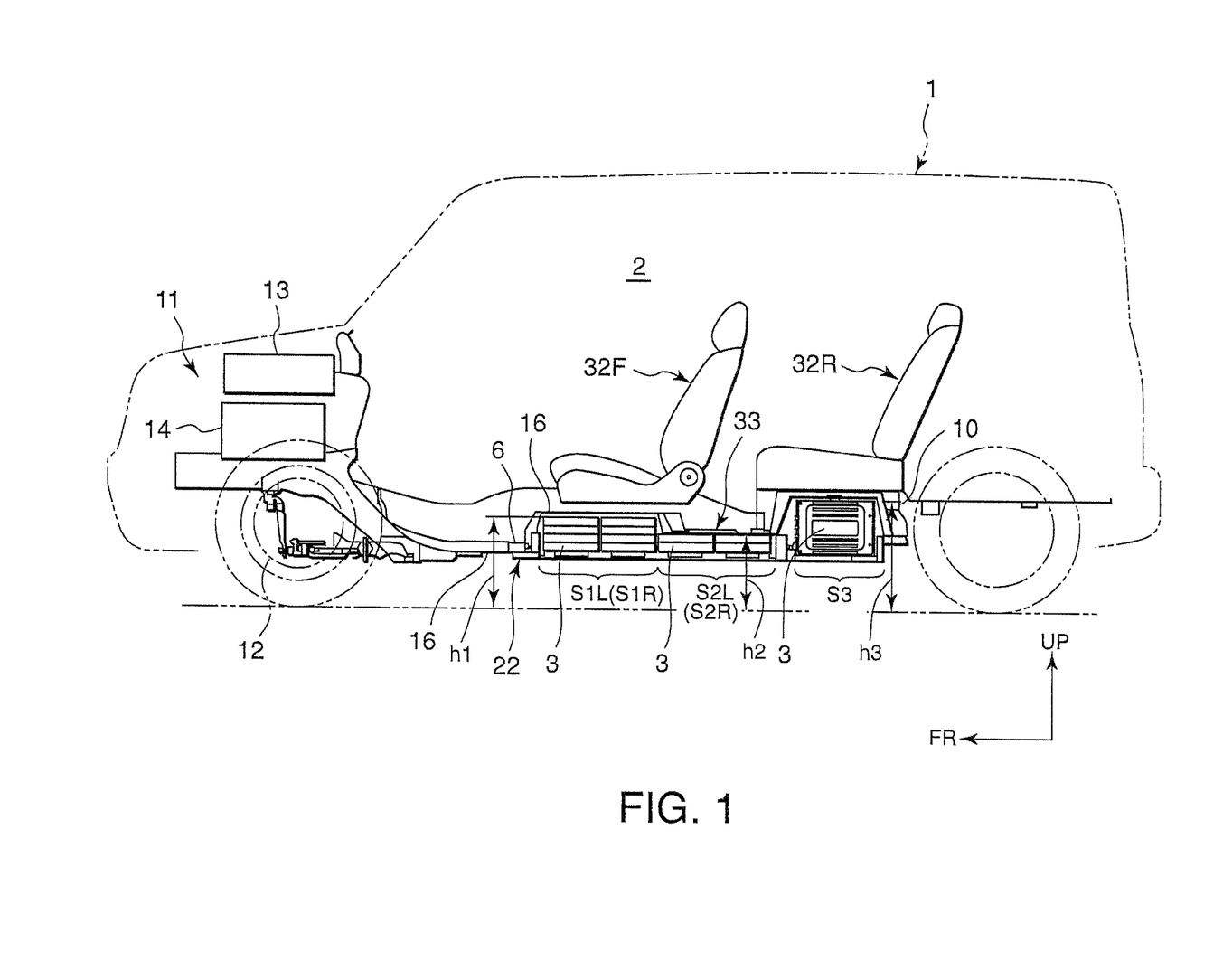
FIG. 1 is a longitudinal sectional view of essential parts of a vehicle showing a vehicle battery mounting structure according to this invention.

Referring to FIG. 1 of the drawings, a vehicle 1 comprises a passenger compartment 2 and a front compartment 11 provided in front of the passenger compartment 2. An arrow UP in the figure points vertically upward and an arrow FR in the figure points frontward with respect to running directions of the vehicle 1. The vehicle 1 is a so-called electric vehicle which runs under a motive force of an electric motor 12 housed in the front compartment 11. The vehicle 1 may be a hybrid-drive vehicle which runs under a motive force generated by an electric motor and a motive force generated by an internal combustion engine or a fuel cell vehicle which runs under a motive force generated by an electric motor which is driven by electric power generated by fuel cells.

To drive the electric motor 12, a number of batteries 3 are arranged in an under floor space of the passenger compartment 2 of the vehicle 1.

Figure 2:
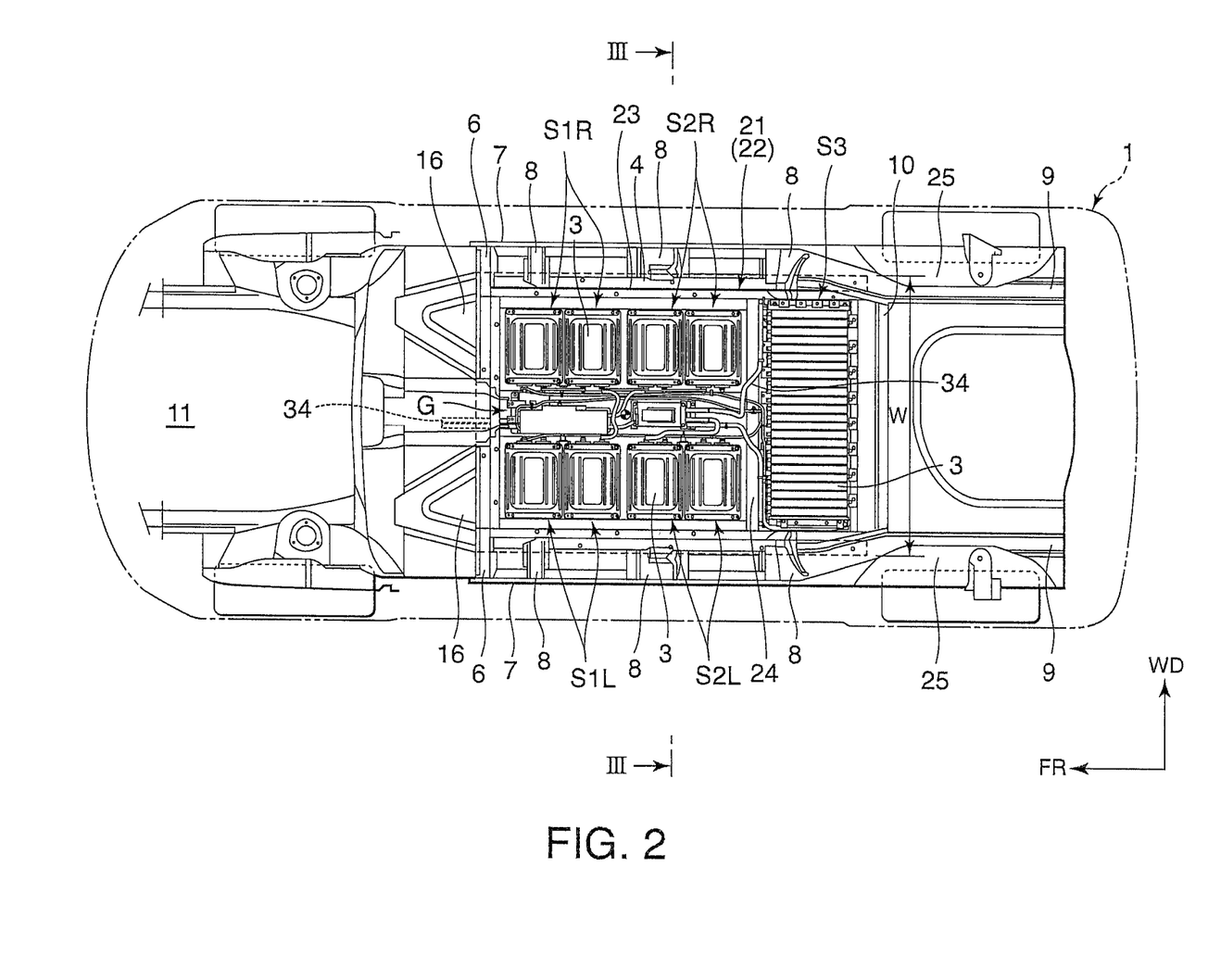
FIG. 2 is a horizontal sectional view of essential parts of the vehicle showing the vehicle battery mounting structure.
Figure 3:
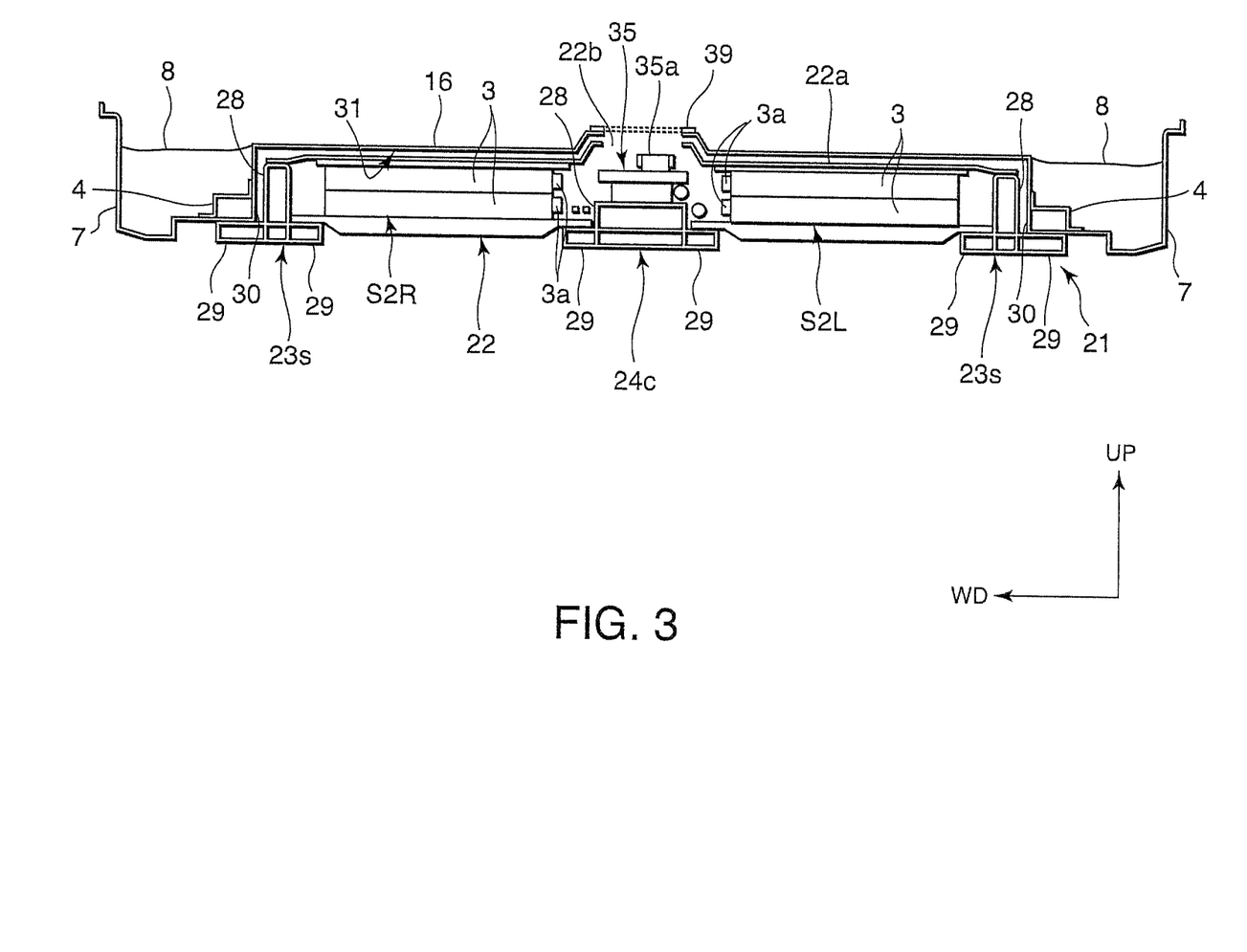
FIG. 3 is a cross-sectional view of essential parts of the vehicle taken along a line III-III of FIG. 2.

Referring to FIGS. 2 and 3, a pair of parallel side members 4 extending in a vehicle longitudinal direction are provided under a floor panel 16 forming a floor of the passenger compartment 2 of the vehicle 1. An arrow WD in the figures points rightward in a vehicle transverse direction when facing frontward with respect to the running directions of the vehicle 1. Front ends of the pair of side members 4 are fixed to a cross member 6 extending in the vehicle transverse direction of the vehicle 1. A pair of rear side members 9 are fixed to rear ends of the pair of side members 4. Rear ends of the pair of the rear side members 9 are fixed to a rear cross member 10 extending in the vehicle 1 in the vehicle transverse direction.

Both ends of the cross member 6 and both ends of the rear cross member 10 are fixed to a side sill 7 which delimits a lower end of a door opening serving as a part of a vehicle body. The pair of side members 4 are located on the inner side of the side sill 7 and each of the side members 4 is fixed to the side sill 7 via three outriggers 8. In FIGS. 2 and 3, a part designated by a reference number 7 corresponds to an inner wall face of the side sill 7. The members 4, 6, 9, and 10 are disposed in advance under the floor panel 16 as a part of the vehicle body.

Referring again to FIG. 1, an electric motor 12 serving as a motive force source for vehicle running, and a battery charger 13 and an inverter 14 serving as related devices are housed in the front compartment 11 of the vehicle 1. The battery charger 13 is a device for charging the batteries 3. The inverter 14 is a device for controlling charge/discharge of the batteries 3. In the following description, the electric motor 12 and the related devices will be referred to comprehensively as electric equipment.

Figure 4:
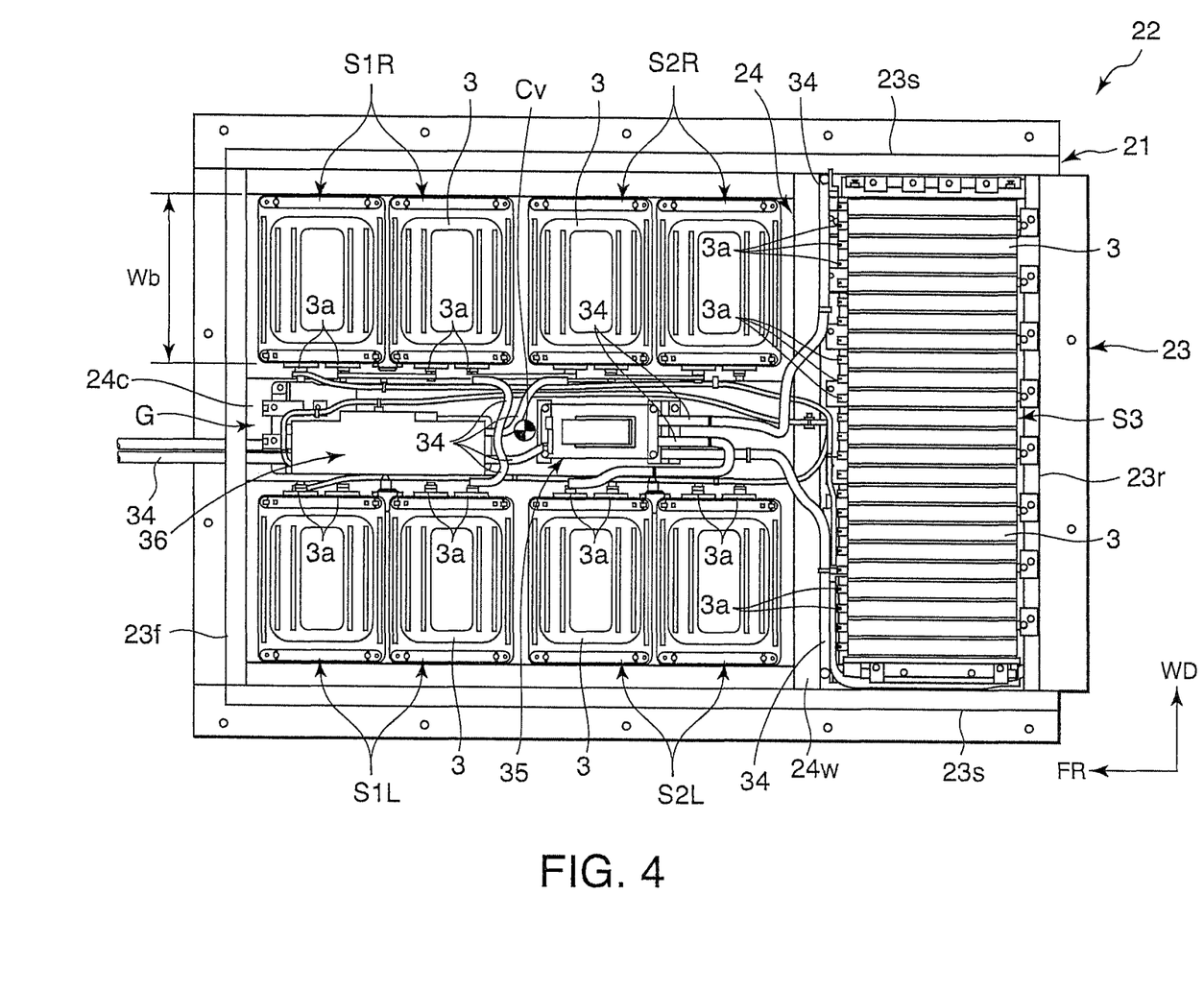
FIG. 4 is a plan view of a battery assembly according to this invention.
Figure 5:
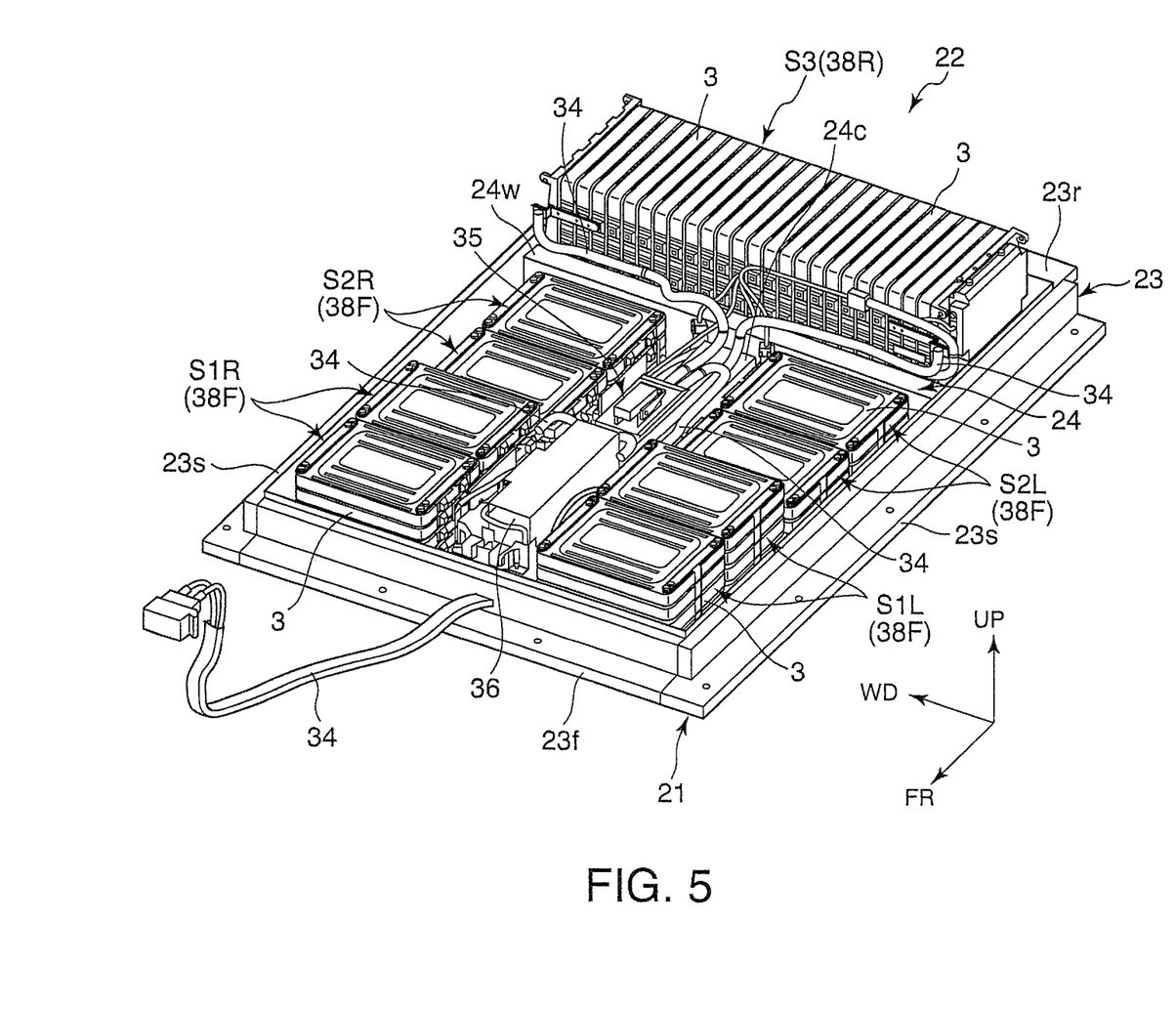
FIG. 5 is a perspective view of the battery assembly.

Referring to FIGS. 4 and 5, the batteries 3 are stacked in advance as a battery assembly 22 on the inner side of a battery mounting frame 21 having a rectangular planar shape. The battery assembly 22 is then fitted into a space surrounded by the pair of side members 4, the cross member 6, the pair of rear side members 9, and the rear cross member 10 from a lower side, Referring to FIG. 6, the battery mounting frame 21 comprises a rectangular frame 23 and a reinforcing member 24 which is arranged in the rectangular frame 23.

Figure 6:
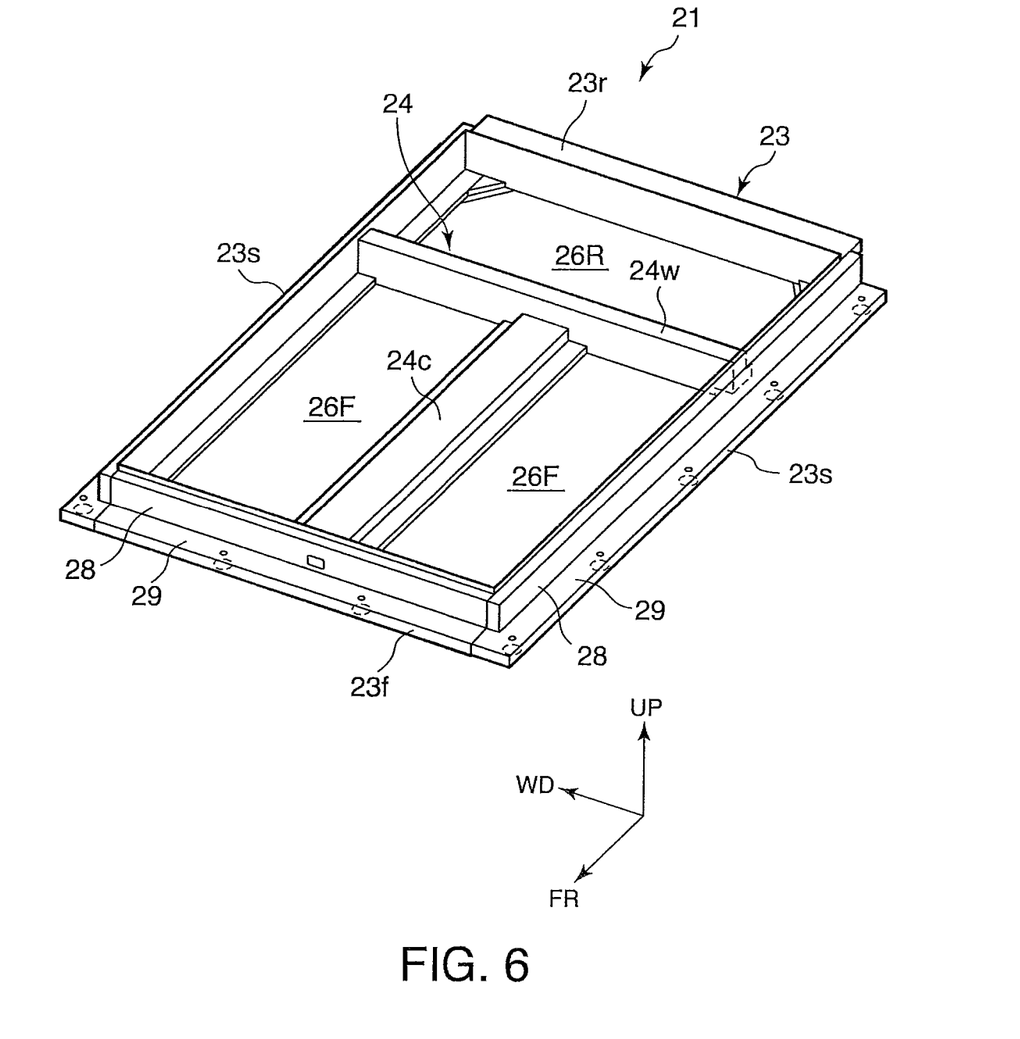
FIG. 6 is a perspective view of a battery mounting frame according to this invention.

The rectangular frame 23 comprises a front edge member 23f, a rear edge member 23r, and a pair of side edge members 23s which connect both ends of the front edge member 23f and both ends of the rear edge member 23r. The front edge member 23f, the rear edge member 23r, and the pair of side edge members 23s form four sides of a rectangle. It should be noted that the terms front-aft and front end/rear end used in the description of the battery assembly 22 mean front-aft and front end/rear end in a state where the battery assembly 22 is fixed to the vehicle body.

Each of the front edge members 23f, the rear edge members 23r, and the pair of side edge members 23s is constituted by an upright wall portion 28 and a flange portion 29 extending horizontally from a lower end of the upright wall portion 28, thereby providing the members 23f, 23r and 23s with an inverted T-shaped cross-section.

The reinforcing member 24 comprises a girder 24w fixed in the rectangular frame 23 in the vehicle transverse direction, and a beam 24c connecting a middle part of the girder 24w and a middle part of the front edge member 23f. The reinforcing member 24 is integrated into the battery mounting frame 21 in advance by welding the girder 24w and the beam 24c into a T-shape, and welding each end of the resultant T-shape member to the rectangular frame 23.

According to the above structure, the inner space of the battery mounting frame 21 is divided into a front rectangular region in front of the girder 24w and a rear rectangular region 26R to the rear of the same. The front rectangular region is further divided into two front rectangular regions 26F, 26F by the beam 24c. A total area of the two front rectangular regions 26F, 26F is substantially the same as an area of the rear rectangular region 26R. The planar shape of these rectangular regions 26F, 26F, 26R is designed such that a long side of the rectangle is substantially double the size of a short side of the rectangle.

Figure 7:
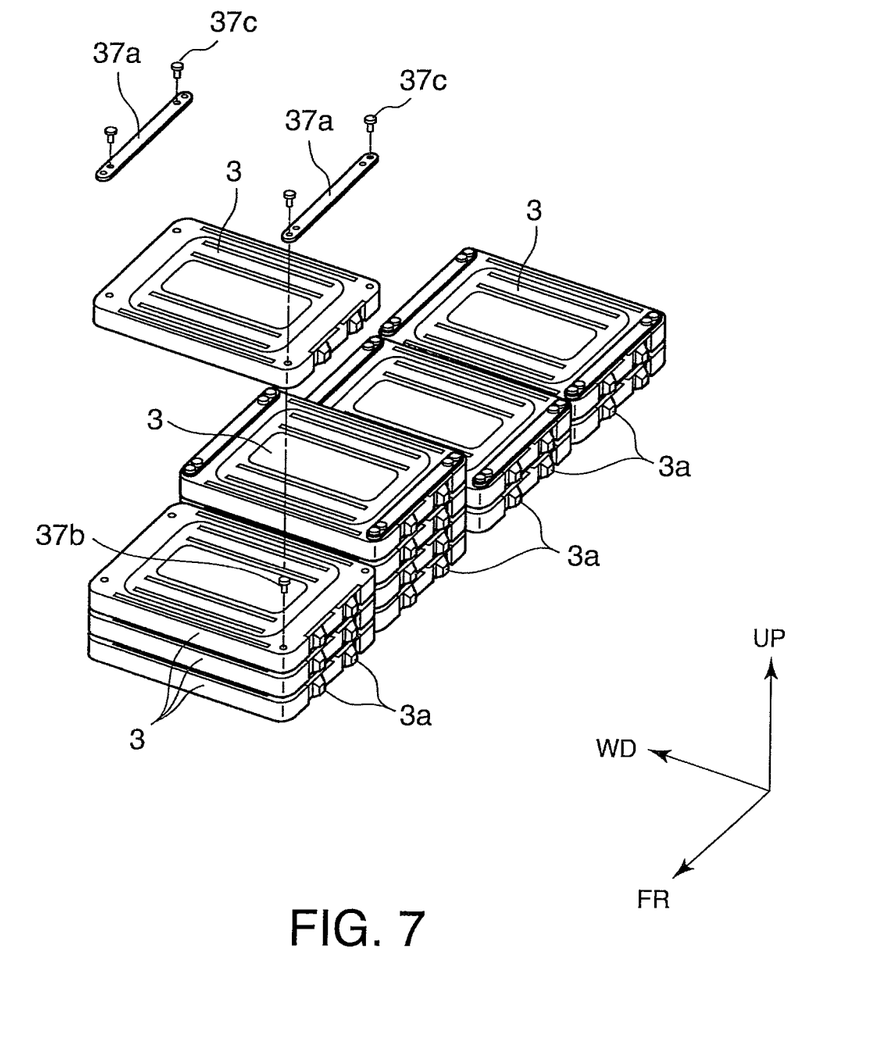
FIG. 7 is an exploded perspective view of a vertical battery stack according to this invention during a battery stacking process.

Referring to FIG. 7, each battery 3 is formed into a flat cuboid. The batteries 3 are stacked in a direction of a shortest side of the three sides of the cuboid. In the following description, the other two sides are referred to as a long side and a short side depending on a length of the sides.

In the two front rectangular regions 26F, 26F, the batteries 3 are stacked in the vertical direction in a state where the long side of the batteries 3 is oriented in the vehicle transverse direction and the short side of the batteries 3 is oriented in the vehicle longitudinal direction. In each of the front rectangular regions 26F, four stacks of the batteries 3 are arranged in the vehicle longitudinal direction. The numbers of stacked batteries 3 are not constant. In the frontmost two stacks in the region 26F, four batteries 3 are stacked in each stack while in the rearmost two stacks in the region 26F, two batteries 3 are stacked in each stack. Thus twelve batteries are stacked in each of the rectangular regions 26F, 26F.

In each stack in the front rectangular regions 26F, 26F, the batteries 3 are stacked via spacers 37b and strip-form plates 37a. The spacer 37b is a member comprising a columnar member and a large diameter part formed in the middle of the columnar member via a step on either side. Through-holes are formed through four corners of the batteries 3 in advance so as to accommodate the columnar part of the spacer 37b. Through-holes are also formed in the strip-form plates 37a.

When the batteries 3 are stacked, one of the columnar parts of a spacer 37b is inserted into a through-hole of the battery 3 after passing through a through-hole of a strip-form plate 37a, and the other columnar part of the spacer 37b is inserted into a through-hole of an adjacent battery 3 after passing through a through-hole of a different strip-form plate 37a. In this way, the large diameter part of the spacer 37b is gripped between the two batteries 3 via the strip-form plates 37a such that a stacking clearance of the batteries 3 is kept constant. The strip-form plate 37a and a spacer 37c comprising a columnar member and a large diameter part formed at an end of the columnar part via a step is attached to an uppermost battery 3 and a lowermost battery 3.

Although not shown in the figures, a through-hole is formed axially in each of the spacers 37b and 37c in advance. After stacking a predetermined number of the batteries 3, a pin is caused to penetrate the through-holes of the spacers 37b and 37c and a nut is screwed on each end of the pin. The batteries 3 are thus integrated into a battery stack.

Referring to FIG. 4, a space G is provided between the stacks in one of the front rectangular regions 26F, 26F and the stacks in the other of the front rectangular regions 26F, 26F. The space G is located above the beam 24c and a region adjacent to the beam 24. The batteries 3 are stacked in the front rectangular regions 26F, 26F such that a terminal 3a of each battery 3 projects into the space G. The terminals 3a of the batteries 3, a harness 34 which electrically connects the terminals 3a and the electric equipment in the front compartment 11, and a switch box 35 and a junction box 36 interposed in the harness 34 are accommodated in the space G.

Figure 8:
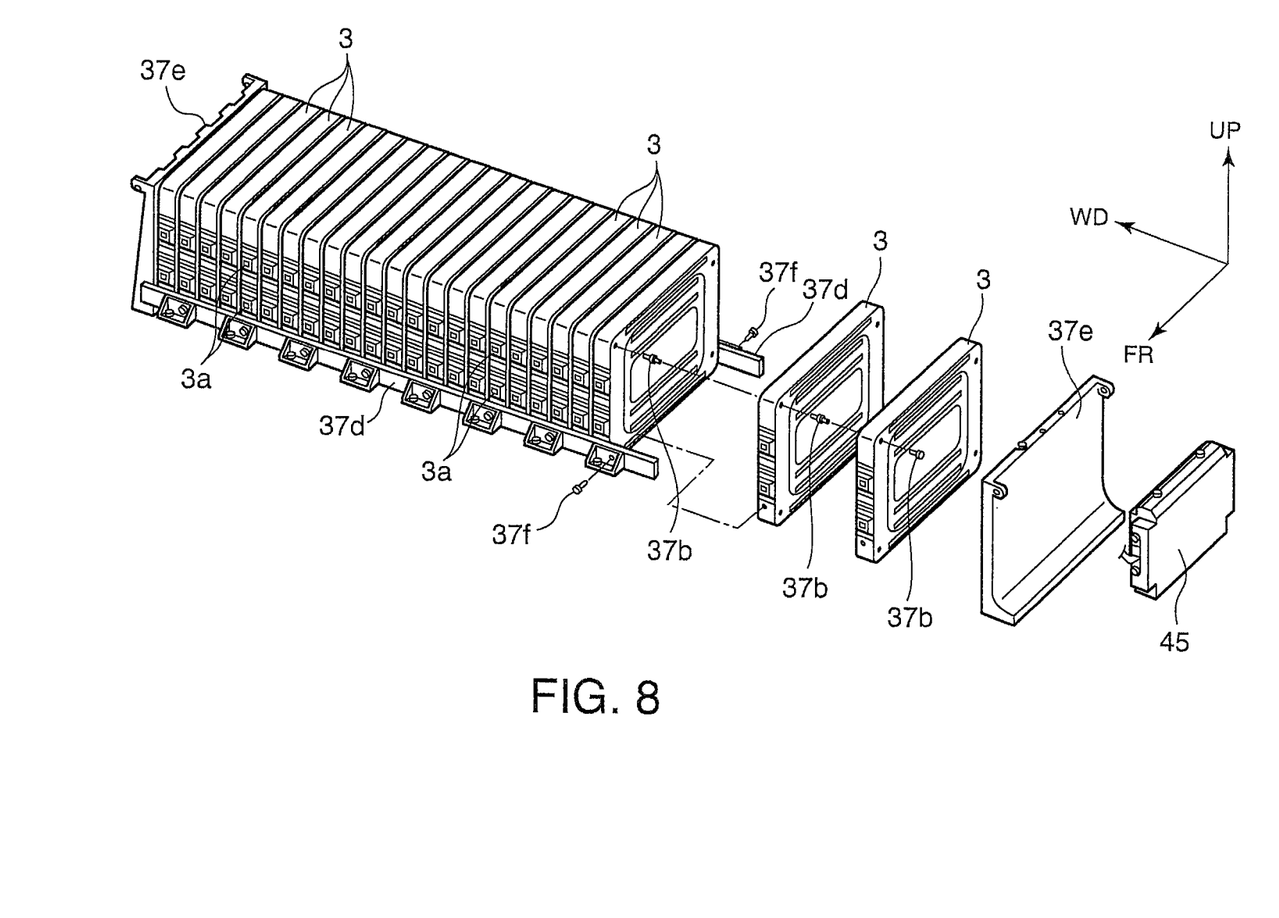
FIG. 8 is an exploded perspective view of a transverse battery stack according to this invention during a battery stacking process.

Referring to FIG. 8, twenty-four batteries 3 are stacked in the transverse direction of the vehicle in the rear rectangular region 26R in a state where the long side of the battery 3 is oriented in the vehicle longitudinal direction. The batteries 3 are stacked with constant clearances via the spacers 37b such that the terminals 3a project frontward. An end plate 37e is stacked on either end of the stack.

Although not shown in the figures, a through-hole is formed axially in each of the spacers 37b in advance. After stacking a predetermined number of the batteries 3, a pin is caused to penetrate the through-holes of the spacers 37b and a nut is screwed on each end of the pin. The batteries 3 are thus integrated into a battery stack.

A supporting plate 37d extending in the vehicle transverse direction is fixed to a front side face and a rear side face of the stack by screws 37f. Only one stack thus constructed is provided in the rear rectangular region 26R.

Referring to FIG. 5, according to the above layout of the batteries 3, a group S1R (S1L) of the batteries 3 comprising two stacks of four batteries 3 stacked in the vertical direction and a group S2R (S2L) of the batteries 3 comprising two stacks of two batteries 3 stacked in the vertical direction are provided in each of the two front rectangular regions 26F, 26F in the battery mounting frame 21. A group S3 of the batteries 3 comprising twenty-four batteries 3 stacked in the vehicle transverse direction is provided in the rear rectangular region 26R in the battery mounting frame 21. With respect to the stacking direction, the groups S1R, S1L and S2R, S2L constitute a first battery unit 38F being a set of vertically stacked batteries 3 while the group S3 constitute a second battery unit 38R being a set of transversely stacked batteries 3.

Figure 9:
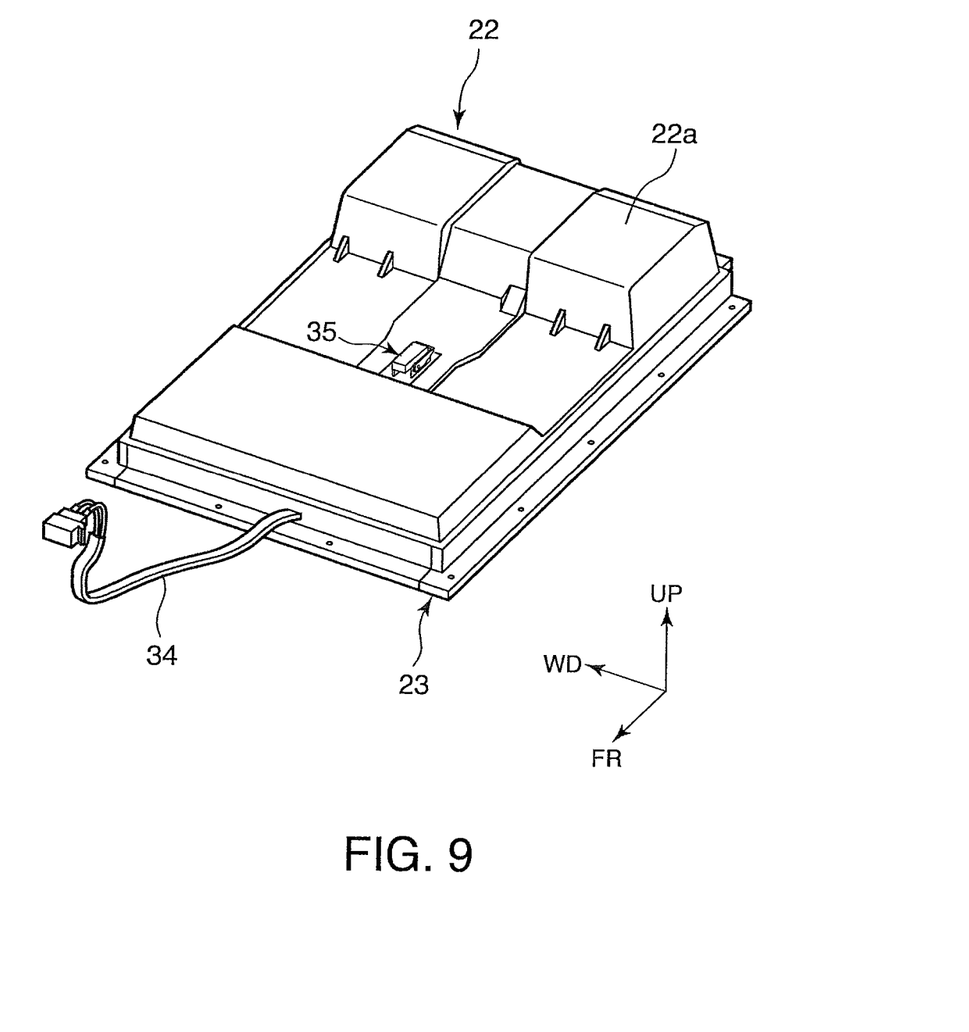
FIG. 9 is a perspective view of a case which accommodates the battery assembly.

Referring to FIGS. 3 and 9, a case 22a is fixed to the battery mounting frame 21 so as to accommodate the battery assembly 22.

The stacks of the batteries 3 are fixed to the case 22a by screws, for example. It is also possible to use the flange portion 29 extending inward from the upright wall portion 28 to fix the stacks. The case 22a is formed into a shape adapted to the battery assembly 22 in advance so as to prevent the stacks from displacing in the transverse, longitudinal, and vertical directions. It is preferable to form an opening or openings in a bottom of the case 22a to increase a cooling capability of the batteries 3. The shape and the number of the openings may be determined arbitrarily.

Referring to FIG. 8, it is preferable to accommodate a control unit 45 constituted, for example, by a microcomputer to control the devices in the junction box 36 in the case 22a on one side of one of the end plates 37e.

Herein, the battery mounting frame 21, the case 22a, the stacks of the batteries 3, the harness 34, the switch box 35, the junction box 36, and the control unit 45 constitute the battery assembly 22.

Referring to FIGS. 1-4, the battery mounting frame 21 is fixed to the cross member 6, the pair of side members 4, the pair of rear side members 9, and the rear cross member 10 using bolts penetrating the flange portion 29 that extends outward from the upright wall portion 28 and nuts screwed onto the bolts. In the fixed state, the upright wall portion 28 of the front edge member 23f faces the cross member 6, the upright wall portion 28 of the rear edge member 23r faces the rear cross member 10, and the upright wall portion 28 of the pair of side edge members 23s faces the side members 4 and a part of the pair of rear side members 9, respectively. Herein, the pair of side members 4, the cross member 6, the pair of rear side members 9, and the rear cross member 10 constitute a fixed member for fixing the battery mounting frame 21 onto the vehicle body.

The battery mounting frame 21 fixed to the fixed member assists in increasing the rigidity and strength of the vehicle body. The rectangular frame 23 and the reinforcing member 24 function as a transferring path for loads input during a vehicle collision.

A downward opening 30 shown in FIG. 3 is formed in the vehicle body by the pair of side members 4, the cross member 6, the pair of rear side members 9, and the rear cross member 10, which constitute the fixed member. The space above the opening 30 is covered by the floor panel 16, thereby forming a housing recess 31 to accommodate the battery assembly 22.

Mounting the battery assembly 22 on the vehicle body is performed by inserting the battery assembly 22 into the housing recess 31 from below the vehicle body and fixing the battery mounting frame 21 to the fixed member using the bolts and nuts. By integrating a number of the batteries 3 into the battery assembly 22 in advance, mounting the batteries 3 on the vehicle 1 can be accomplished easily. The batteries 3 thus mounted on the vehicle 1 can also be removed easily for replacement.

As shown in FIG. 1, the vehicle 1 comprises a front seat 32F and a rear seat 32R in the passenger compartment 2. The shape and size of the battery assembly 22, the shape and the size of the batteries 3, and the location of the fixed member are predetermined such that the group S1R (S1L) of the batteries 3 is located substantially below the front seat 32F, the group S2R (S2L) of the batteries 3 is located below the floor 33 between the front seat 32F and the rear seat 32R, and the group S3 of the batteries 3 is located below the rear seat 32R in a state where the battery assembly 22 is fitted into the housing recess 31. Further, the shape of the floor panel 16 and the case 22a are predetermined on the basis of the shape of the battery assembly 22.

Assuming that the height of the group S1R (S1L) of the batteries 3 is h1, the height of the group S2R (S2L) of the batteries 3 is h2, and the height of the group S3 of the batteries 3 is h3, the relation h3>h1>h2 holds. The heights h1 and h2 are common to the right rectangular region 26F and the left rectangular region 26F.

The group S1R (S1L) of the batteries 3 is located under the front seat 32F, and the group S3 of the batteries 3 is located under the rear seat 32R. By setting the height h1 of the group S1R (S1L) of the batteries 3 and the height h3 of the group S3 of the batteries 3 to be greater than the height h2 of the group S2R (S2L) of the batteries 3, a space under the seats 32F and 32R in the passenger compartment 2 can be utilized efficiently for mounting the batteries 3, and a large number of the batteries 3 can be mounted on the vehicle 1 without affecting the comfort of the passenger compartment 2. Since the height h3 of the group S3 of the batteries 3 is higher than the height h1 of the group S1R (S1L) of the batteries 3, the sitting level of the rear seat 32R becomes higher than the sitting level of the front seat 32F in the passenger compartment 2. This setting is preferable in terms of providing a wide view for passengers in the rear seat 32R.

The groups S1R, S1L of the batteries 3 on the right and left of the beam 24 are constituted by sixteen batteries in total. The groups S2R, S2L of the batteries 3 on the right and left of the beam 24 are constituted by eight batteries in total. The group S3 of the batteries 3 is constituted by twenty-four batteries. That is to say twenty-four batteries are mounted in front of the girder 24w and in the rear of the girder 24w, respectively. As a result, the weight of the groups S3 of the batteries 3 is heavier than the total weight of the groups S2R, S2L of the batteries 3 and heavier than the total weight of the groups S1R, S1L of the batteries 3, and substantially equal to the total weight of the groups S2R, S2L of the batteries 3 and the groups S1R, S1L of the batteries 3.

According to the above arrangement of the batteries 3, the center of gravity of the battery assembly 22 is located to the rear of the center of a plan view of the battery assembly 22. Assuming that Cv in FIG. 4 is the graphical center of the vehicle 1, the center of gravity of the battery assembly 22 is located to the rear of the graphical center Cv of the vehicle 1. Considering that the electric equipment comprising the electric motor 12, the battery charger 13, and the inverter 14 is accommodated in the front compartment 11 of the vehicle 1, locating the center of gravity of the battery assembly 22 to the rear of the graphical center Cv of the vehicle 1 is preferable in terms of the weight balance of the vehicle 1 in the front-aft direction.

In the groups S1R, S1L and S2R, S2L of the batteries 3, the batteries 3 are stacked such that the long side is oriented in the vehicle transverse direction and the short side is oriented in the vehicle longitudinal direction. In this case, the density of the batteries 3 or the clearance between the batteries 3 in the vehicle transverse direction is determined according to the width W of the lower part of the vehicle body shown in FIG. 2 and the length Wb of the long side of the batteries 3 shown in FIG. 4. With respect to the groups S1R, S1L and S2R, S2L of the batteries 3, a space G formed between a row of the battery stacks in one of the rectangular regions 26F and a row of the battery stacks in the other rectangular region 26F contributes to this adjustment of the clearance. In the groups S1R, S1L and S2R, S2L of the batteries 3, the batteries 3 are stacked in the vertical direction. The respective heights h1 and h2 of the groups S1R, S1L and S2R, S2L of the batteries 3 can therefore be adjusted minutely by an adjustment unit equal to the length of the shortest side of the battery 3.

With respect to the group S3 of the batteries 3, the batteries 3 are stacked such that the shortest side is oriented in the vehicle transverse direction. Accordingly, by adjusting the stacking number of the batteries 3 and the clearance between the batteries 3 depending on the width W of the lower part of the vehicle body, the length of the group S3 of the batteries 3 in the vehicle transverse direction can be adjusted minutely and a large number of the batteries 3 can be mounted using the space under the rear seat 32R efficiently.

According to the type of the vehicle 1, a rear space in the passenger compartment 2 may be limited due to a rear wheel house 25 shown in FIG. 2 or a rear suspension. Since the dimension in the vehicle transverse direction of the group S3 of the batteries 3, which is located in the rear space in the passenger compartment 2, can be adjusted minutely as described above, a difference in the size of the rear space in the passenger compartment 2 can be absorbed easily.

As shown in FIG. 1, the groups S1R, S1L and S2R, S2L of the batteries 3 respectively have two battery stacks arranged in the vehicle longitudinal direction. However, this number of battery stacks can be altered depending on the dimension of the vehicle 1 in the longitudinal direction. For example, the group S1R (S1L) of the batteries 3 may be constituted by three battery stacks arranged in the vehicle longitudinal direction while the group S2R (S2L) of the batteries 3 is constituted by only one battery stack.

Thus, even when the layout of the seats of the vehicle 1 is changed, an optimum layout of the batteries can be realized by simply altering the number of the battery stacks in the groups S1R, S1L, S2R, S2L, S3 without modifying the dimensions of the battery mounting frame 21. As a result, the battery mounting frame 21 can be applied to various types of vehicles.

According to the battery mounting structure described above, the rear edge member 23r and the girder 24w of the battery mounting frame 21 are located relatively near to the rear suspension. These members bring about an effect of increasing the rigidity of the vehicle body against a direct load input into the vehicle body when a rear side of the vehicle 1 undergoes a collision or an upward impact load transmitted from the rear suspension to the vehicle body. In the group S3 of the batteries 3, by stacking the batteries 3 in close contact with one another and increasing the strength of stack supporting members such as the supporting plates 37d, it is possible to cause the battery stack to contribute to an increase in the rigidity and strength of the vehicle body.

Since the harness 34, the switch box 35, and the junction box 36 are accommodated in the space G and the groups S1R, S1L and S2R, S2L of the batteries 3 are stacked such that the terminals 3a project into the space G. The space G, which is not used for stacking the batteries 3, is utilized effectively in the layout of these members. Putting the first battery unit 38F constituted by the vertically stacked batteries in front of the second battery unit 38R constituted by the transversely stacked batteries is also preferable in terms of obtaining the space for the layout of these members.

In the group S3 of the batteries 3, the batteries 3 are stacked such that the terminals 3a project frontward, or in other words into the upper space of the girder 24w. This layout of the batteries 3 is preferable in terms of protecting the terminals 3 in case of collision of the vehicle 1. Further, according to this layout of the batteries 3, connecting the harness 34 to the terminals 3a can be performed easily by using the upper space of the girder 24w. Still further, the durability of the harness 34 can be increased using the girder 24w to support the harness 34.

Figure 10:
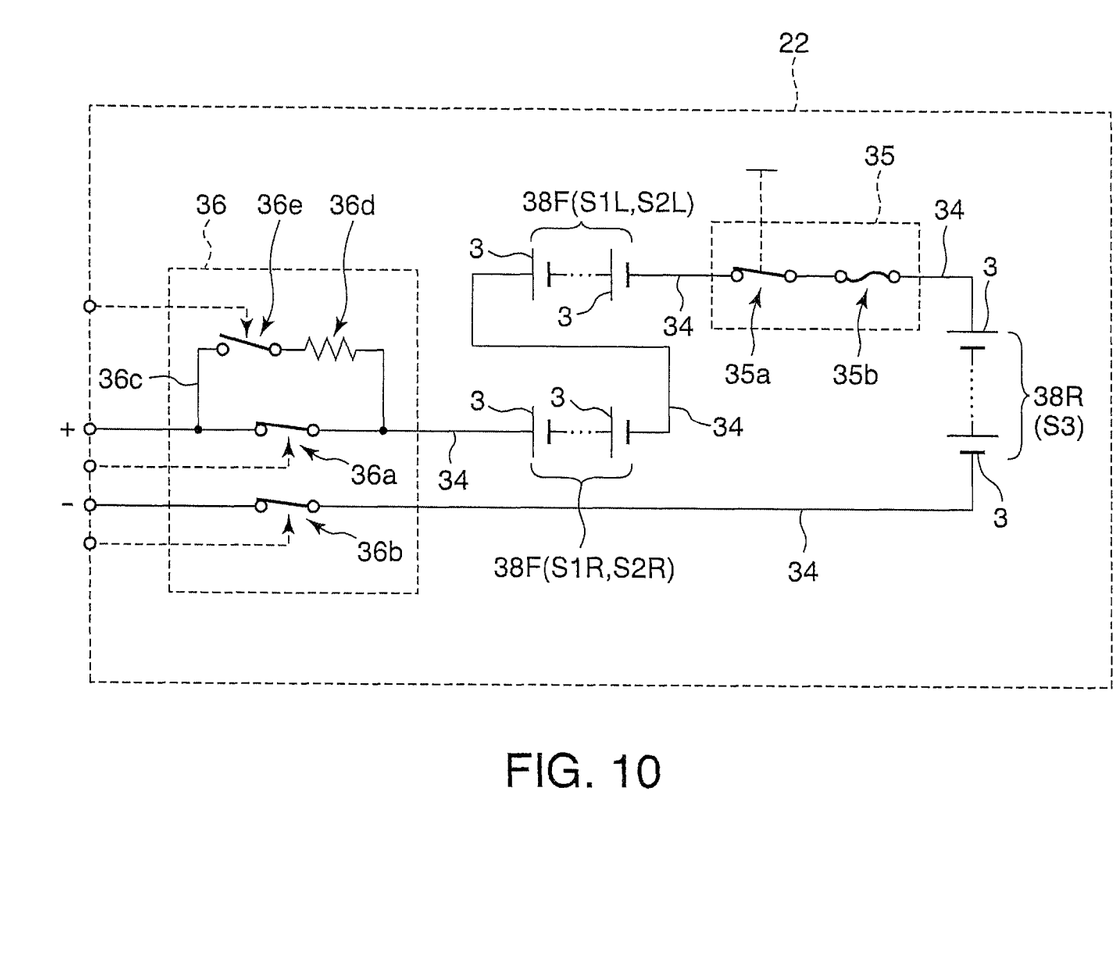
FIG. 10 is an electric circuit diagram of the battery assembly.

Referring to FIG. 10, an electric circuit of the battery assembly 22 will be described.

The electric circuit of the battery assembly 22 connects the batteries 3 in the group S3 and the batteries 3 in the groups S1R, S1L and S2R, S2L on the right and left rectangular regions 26F in series using the harness 34. The switch box 35 is interposed in the harness 34 between the batteries 3 in the group S3 and the batteries 3 in the groups S1R, S1L and S2R, S2L. The junction box 36 is interposed between the terminals connected to both ends of the batteries 3.

The switch box 35 comprises a manually-operated relay 35a and a fuse 35b connected in series. The manually-operated relay 35a connects and disconnects the group S3 of the batteries 3 and the groups S1R, S1L and S2R, S2L of the batteries 3. In this embodiment, the electric circuit of the battery assembly 22 is divided into one circuit for the first battery unit 38F constituted by the groups S1R, S1L and S2R, S2L of the batteries 3 in the right and left rectangular regions 26F and another circuit for the secondary battery unit 38R constituted by the group S3 of the batteries 3. The terminal voltage of the first battery unit 38F and the terminal voltage of the second battery unit 38R are set to be equal in compliance with SAEJ2344. The number of batteries stacked in each of the first battery unit 38F and the second battery unit 38R is twenty-four. The manually-operated relay 35a and the fuse 35b constitute a switching device.

The junction box 36 comprises a main conductor 36a which electrically connects a positive electrode of the first battery unit 38F and the inverter 14, and a sub-conductor 36b which electrically connects and disconnects a negative electrode of the second battery unit 38R and the inverter 14.

Further, in the junction box 36, a pre-charge circuit 36c comprising a resistor 36d and a pre-charge conductor 36e connected in series is provided in parallel with the main conductor 36a. Opening and closing operations of the main conductor 36a, the sub-conductor 36b, and the pre-charge conductor 36e are performed in response to opening/closing signals output from the aforesaid control unit 45. The junction box 36 may further comprise a voltage detecting device for detecting an output voltage of the battery units 38F, 38R and a current detecting device for detecting a power current output by the battery units 38F, 38R. The main conductor 36a, the sub-conductor 36b, the resistor 36d, and the pre-charge conductor 36e constitute a wire connecting device.

The switch box 35 is located farther from the inverter 14 than the junction box 36, or in other words in the rearmost part in the space G.

The switch box 35 is interposed between the first battery unit 38F and the second battery unit 38R as described above. In a physical sense also, the switch box 35 is preferably located near the midpoint between the first battery unit 38F and the second battery unit 38R so as to shorten the required length of the harness 34. In FIG. 10, the junction box 36 is disposed between the battery units 38F, 38R and the electric equipment. In a physical sense also, the junction box 36 is preferably disposed in front of the switch box 35 so as to shorten the required length of the harness 34.

In contrast, in a vehicle in which the electric equipment is disposed in the rear of the battery assembly 22, the junction box 36 is preferably disposed in the rear of the switch box 35.

Figure 11:
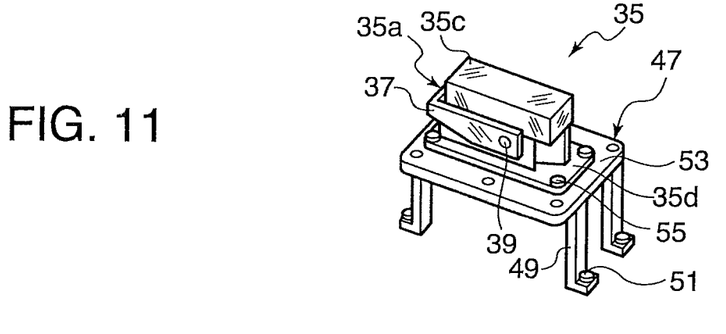
FIG. 11 is a perspective view of a manually-operated relay and a support therefor according to this invention.

Referring to FIG. 11, a supporting structure for the switch box 35 will be described.

The switch box 35 is supported by a support 47 fixed to the beam 24c. The support 47 comprises a deck 53 to which the switch box 35 is fixed and four leg parts 49 for supporting the deck on the beam 24c. The four leg parts 49 are fixed to the beam 24c using bolts 51, respectively. The switch box 35 comprises a plate 35d which is fixed to the deck 53 using bolts 55.

The manually-operated relay 35a comprises a base portion 35c that projects upward from the plate 35d and an operating lever 37 that is supported by the base portion 35c via a shaft 39 so as to be free to rotate. When the operating lever 37 is rotated upward about the shaft 39, an electrical connection between the first battery unit 38F and the second battery unit 38R is cut off. The fuse 35b is fixed to the base portion 35c, for example.

By supporting the switch box 35 using the support 47 having the four leg parts 49 as described above, a space generated by the four leg parts 49 can be utilized for disposing the harness 34.

Fixing the deck 53 to the case 22a may be a preferable option in terms of enhancing the rigidity of the case 22a.

Referring again to FIG. 3, an opening 22b is formed in the case 22a and a floor panel 16 covering the manually-operated relay 35a from above so as to operate the manually-operated relay 35a in the switch box 35 from within the passenger compartment 2. Further, a lid 39 is provided to cover the opening 22b. The lid 39 is designed to open and close such that the manually-operated relay 35a is exposed to the passenger compartment 2 and hidden therefrom. The switch box 35 is located between the right and left front seats 32F. By disposing the switch box 35 in this way, opening and closing the lid 39 and operating the manually-operated relay 35a can be conducted without displacing the front seat 32F. The switch box 35 may however be disposed in a different location.

Figure 12:
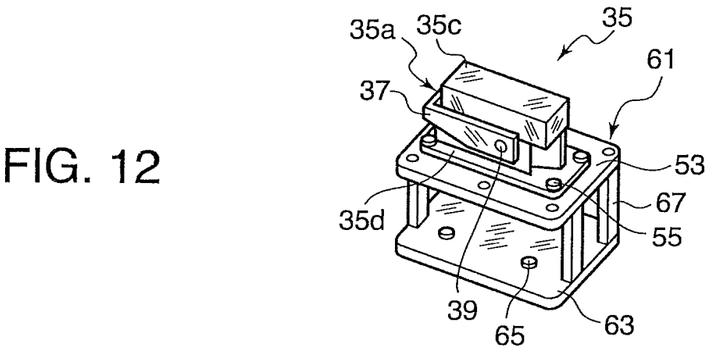
FIG. 12 is similar to FIG. 11 but shows a second embodiment of this invention.

Referring to FIG. 12, a second embodiment of this invention with respect to the supporting structure of the switch box 35 will be described.

In this embodiment, the switch box 35 is supported by the beam 24c via a support 61 instead of the support 47 of the first embodiment.

The support 61b comprises the deck 53, a bottom plate 63, and four leg parts 67 that support the deck 53 on the bottom plate 64. The deck 53, bottom plate 63, and four leg parts 67 are formed into one piece in advance. The bottom plate 63 is fixed to the beam 24c using bolts 65.

Supporting the switch box 35 using the support 61 also brings about a preferable effect in terms of ensuring a space for disposing the harness 34, as in the case of the first embodiment where the support 47 is used for supporting the switch box 35. Further, according to this embodiment, the support 63 made into one piece, and therefore a higher supporting rigidity is realized in the switch box 35 than in the case where it is supported by the support 47.

Figure 13:
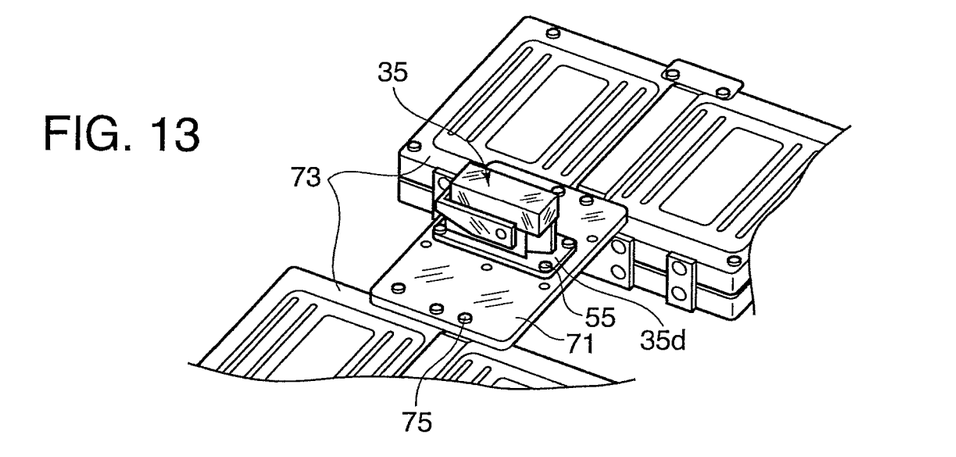
FIG. 13 is a perspective view of essential parts of a battery assembly showing a support according to a third embodiment of this invention.

Referring to FIG. 13, a third embodiment of this invention with respect to the supporting structure of the switch box 35 will be described.

In this embodiment, the switch box 35 is supported by the first battery unit 38F instead of being supported on the beam 24c.

Specifically, a supporting plate 71 that straddles two groups S2R and S2L of the batteries 3, which form the first battery unit 38F, is provided and the plate 35d of the switch box 35 is fixed to the supporting plate 71 using the bolts 55.

The supporting plate 71 is fixed to the groups S2R and S2L of the batteries 3 using four bolts 75.

According to this embodiment also, a space formed under the switch box 35 is utilized effectively to dispose the harness 34 as in the case of the first and second embodiments.

The contents of Tokugan 2009-41227, with a filing date of Feb. 24, 2009 in Japan and Tokugan 2009-169005, with a filling date of Jul. 17, 2009 in Japan are hereby incorporated by reference.

Although the invention has been described above with reference to certain embodiments, the invention is not limited to the embodiments described above. Modifications and variations of the embodiments described above will occur to those skilled in the art.

For example, the shape of the batteries 3 is not necessarily a flat cuboid. It is not vital that all of the batteries 3 have an identical shape and identical dimensions.

Although in this embodiment, the two groups S1R, S1L and S2R, S2L of the batteries 3 are provided as the first battery unit 38F, the first vertical unit 38F may be constituted by one group of the batteries 3. Also in this embodiment, the space G is formed above the beam 24c so that the groups S1R, S1L and S2R, S2L of the batteries 3 are located on the right and left of the space G. However, it is possible to eliminate the space G and arrange the battery stacks of the first battery unit 38F without a clearance in the vehicle transverse direction depending on the width W of the lower part of the vehicle body and the dimensions of the batteries 3.

The battery mounting frame 21 need not be made in a rectangular shape, and may be made in a different shape depending on the type of the vehicle 1. Instead of connecting the girder 24w and the beam 24c in a T-shape, they may be connected in a cruciform shape.

Further, the battery mounting frame 21 is not an essential component of this invention. When the batteries 3 are mounted on a vehicle without using the battery mounting frame 21, a preferable weight balance in a front-aft direction of the vehicle is realized by providing a first battery unit 38F comprising the vertically stacked batteries 3 and a second battery unit 38R comprising the transversely stacked batteries 3.

The electric circuit of the battery assembly 22 shown in FIG. 10 is also not an essential component of this invention. This invention can be applied to any vehicle on which a plurality of the batteries 3 are mounted, irrespective of the electric circuit of the batteries 3.

INDUSTRIAL FIELD OF APPLICATION

As described above, the vehicle battery mounting structure according to this invention is preferably applied to an electric vehicle, but not limited thereto.

The embodiments of this invention in which an exclusive property or privilege is claimed are defined as follows:

1. A vehicle battery mounting structure for mounting a plurality of batteries under a floor panel of a vehicle, comprising:
   at least one battery unit comprising a first battery unit which comprises a plurality of the batteries; and
   a connection control device which controls electrical connection relating to the first battery unit;
   wherein the first battery unit comprises two groups of the batteries disposed to have a space there-between, the connection control device is disposed in the space, and each of the batteries comprises a terminal projecting from a surface of the battery facing the space toward the space,
   wherein the vehicle comprises a passenger compartment and the connection control device comprises an operation member which is exposed to the passenger compartment and operated manually therefrom,
   wherein the passenger compartment comprises a right front seat and a left front seat, and the operation member is disposed in a transversely centermost space in front of a rear seat of the vehicle including a space between the right front seat and the left front seat, and
   wherein the floor panel covers the operation member from above so as to operate the operation member from within the passenger compartment.

2. The vehicle battery mounting structure as defined in claim 1, wherein the at least one battery unit comprises a second battery unit which comprises a plurality of the batteries and is connected to the first battery unit via the connection control device, and wherein the vehicle comprises electric equipment that uses a power supplied from the first and second battery units, and the first battery unit is located nearer to the electric equipment than the second battery unit.

3. The vehicle battery mounting structure as defined in claim 2, wherein the first battery unit and the second battery unit are spaced apart in a vehicle longitudinal direction, and the two groups of the batteries are spaced apart in a vehicle transverse direction such that the space is formed between the two groups of batteries.

4. The vehicle battery mounting structure as defined in claim 2, wherein the connection control device comprises a switching box and the operation member is provided as a part of the switching box for electrically connecting and disconnecting the first battery unit and the second battery unit.

5. The vehicle battery mounting structure as defined in claim 4, wherein the connection control device further comprises a wire connecting device for controlling a connection between the first and second battery units and the electric equipment.

6. The vehicle battery mounting structure as defined in claim 5, wherein the wire connecting device is disposed nearer to the electric equipment than the switching box.

7. The vehicle battery mounting structure as defined in claim 2, wherein the first battery unit further comprises second two groups of the batteries in the rear of the first two groups of the batteries, and the second two groups of the batteries are disposed to have a space there-between which is continuous with the space between the first two groups of the batteries.

8. The vehicle battery mounting structure as defined in claim 7, wherein a floor located between the front seats and the rear seat are provided in the passenger compartment and the vehicle further comprises a front compartment formed in front of the passenger compartment with respect to a vehicle longitudinal direction for accommodating the electric equipment, the first two groups of the batteries are mounted under the front seats, the second two groups of the batteries are mounted under the floor, and the second battery unit is mounted under the rear seat.

9. The vehicle battery mounting structure as defined in claim 2, further comprising a battery mounting frame in which the first battery unit, the second battery unit, and the connection control device are fitted in advance as a battery assembly so as to be fixed to an underside of the floor panel via the battery mounting frame.

10. The vehicle battery mounting structure as defined in claim 9, wherein the battery mounting frame comprises a rectangular frame having a rectangular planar shape and a reinforcing member fixed to an inside of the rectangular frame.

11. The vehicle battery mounting structure as defined in claim 10, wherein the rectangular frame comprises a front edge member extending in a vehicle transverse direction and the reinforcing member is constituted by a girder fixed to an inside of the rectangular frame in a vehicle transverse direction and a beam connecting the girder and the front edge member, the girder and the beam forming a T-shape in a plan view.

12. The vehicle battery mounting structure as defined in claim 11, wherein the first battery unit is disposed on both sides of the beam in the rectangular frame whereas the second battery unit is disposed on the opposite side of the girder to the beam in the rectangular frame.

13. The vehicle battery mounting structure as defined in claim 9, wherein the vehicle comprises a fixed member for fixing the battery mounting frame.

14. The vehicle battery mounting structure as defined in claim 2, wherein the first battery unit, the second battery unit, and the connection control device are housed in a case in advance and fixed to the underside of the floor panel via the case.

15. The vehicle battery mounting structure as defined in claim 2, wherein the electric equipment comprises an electric motor and a related device as a motive force source for vehicle travel.

16. The vehicle battery mounting structure as defined in claim 1, wherein the connection control device comprises a switching box and the operation member is provided as a part of the switching box for realizing an electrical connection and disconnection within the at least one battery unit, and the battery mounting structure comprises a support that supports the switching box in a position elevated from a base of the space.

17. The vehicle battery mounting structure as defined in claim 16, further comprising a case for accommodating the at least one battery unit, wherein the case and the floor panel have an opening facing the switching box.

18. The vehicle battery mounting structure as defined in claim 16, wherein the support comprises a deck on which the switching box is fixed and leg parts that support the deck.

19. The vehicle battery mounting structure as defined in claim 16, wherein the support comprises a supporting plate that straddles the two groups of the batteries and is fixed thereto, and the switching box is fixed to the supporting plate.

20. The vehicle battery mounting structure according to claim 1, wherein the operation member is disposed in the space between the right front seat and the left front seat.

21. A battery assembly comprising a plurality of batteries and mounted under a floor panel of a vehicle, comprising:

a battery unit comprising a plurality of batteries; and a connection control device which controls electrical connection relating to the battery unit;

wherein the battery unit comprises two groups of the batteries disposed to have a space there-between, the connection control device is disposed in the space, and each of the batteries comprises a terminal projecting from a surface of the battery facing the space toward the space;

wherein the vehicle comprises a passenger compartment and the connection control device comprises an operation member which is exposed to the passenger compartment and operated manually therefrom;

wherein the passenger compartment comprises a right front seat and a left front seat, and the operation member is disposed in a transversely centermost space in front of a rear seat of the vehicle including a space between the right front seat and the left front seat, and wherein the floor panel covers the operation member from above so as to operate the operation member from within the passenger compartment.

22. The battery assembly according to claim 21, wherein the operation member is disposed in the space between the right front seat and the left front seat.

* * * * *